US012298817B2

(12) United States Patent
Yoon et al.

(10) Patent No.: US 12,298,817 B2
(45) Date of Patent: May 13, 2025

(54) ELECTRONIC DEVICE INCLUDING HINGE DEVICE

(71) Applicant: SAMSUNG ELECTRONICS CO., LTD., Suwon-si (KR)

(72) Inventors: Hyunjoong Yoon, Suwon-si (KR); Gyunghoon Lee, Suwon-si (KR); Yongwon Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 277 days.

(21) Appl. No.: 17/974,044

(22) Filed: Oct. 26, 2022

(65) Prior Publication Data

US 2023/0126247 A1 Apr. 27, 2023

Related U.S. Application Data

(63) Continuation of application No. PCT/KR2022/016185, filed on Oct. 21, 2022.

(30) Foreign Application Priority Data

Oct. 21, 2021 (KR) .......................... 10-2021-0140860

(51) Int. Cl.
*G06F 1/16* (2006.01)
*H01Q 1/22* (2006.01)

(52) U.S. Cl.
CPC .......... *G06F 1/1681* (2013.01); *G06F 1/1616* (2013.01); *G06F 1/1698* (2013.01); *H01Q 1/2266* (2013.01)

(58) Field of Classification Search
CPC .... G06F 1/1681; G06F 1/1616; G06F 1/1698; G06F 1/1683; H01Q 1/2266
See application file for complete search history.

(56) References Cited

U.S. PATENT DOCUMENTS

| 7,559,777 | B2 | 7/2009 | Lin et al. |
| 7,564,412 | B2 * | 7/2009 | Walker ................ H01Q 1/2266 343/702 |

(Continued)

FOREIGN PATENT DOCUMENTS

| CN | 112727908 A | 4/2021 |
| JP | 2011055365 A | 3/2011 |

(Continued)

OTHER PUBLICATIONS

English Translation of International Search Report mailed on Jan. 31, 2023 and issued in corresponding International patent application No. PCT/KR2022/016185, 2 pp.

(Continued)

*Primary Examiner* — Anthony M Haughton
*Assistant Examiner* — Theron S Milliser
(74) *Attorney, Agent, or Firm* — CANTOR COLBURN LLP

(57) ABSTRACT

An electronic device includes a first housing, a second housing, a hinge device that foldably couples the first housing and the second housing to each other, and at least one electrical connection member that connects a component included in the first housing and a component included in the second housing, to each other. The hinge device may include at least one hinge, at least one first hinge bracket that connects the hinge and the first housing to each other, at least one second hinge bracket that connects the hinge and the second housing to each other, and a support that supports the at least one electrical connection member, where the support may be fixed via the same fastening structure as the first hinge bracket.

20 Claims, 9 Drawing Sheets

(56) References Cited

U.S. PATENT DOCUMENTS

| | | | |
|---|---|---|---|
| 8,274,434 B2* | 9/2012 | Kusaka | G06F 1/1683 |
| | | | 343/702 |
| 8,385,053 B2* | 2/2013 | Shirasaka | G06F 1/1656 |
| | | | 361/679.01 |
| 8,576,569 B2 | 11/2013 | Malek et al. | |
| 8,587,961 B2* | 11/2013 | Matsumura | H05K 5/00 |
| | | | 361/825 |
| 8,687,353 B2* | 4/2014 | Murakata | G06F 1/1681 |
| | | | 343/702 |
| 8,710,376 B2* | 4/2014 | Malek | H05K 1/0216 |
| | | | 361/818 |
| 8,982,571 B2* | 3/2015 | Matsumura | H05K 7/02 |
| | | | 361/752 |
| 8,993,899 B2* | 3/2015 | Malek | H04N 23/55 |
| | | | 174/382 |
| 9,069,523 B2* | 6/2015 | Hayashida | G06F 1/1607 |
| 10,638,632 B2 | 4/2020 | Park | |
| 11,184,980 B2 | 11/2021 | An et al. | |
| 11,219,136 B2* | 1/2022 | Park | H05K 1/14 |
| 11,314,284 B2 | 4/2022 | Kim | |
| 11,510,328 B2* | 11/2022 | Kim | H04M 1/0216 |
| 11,800,600 B2* | 10/2023 | Tan | G06F 1/182 |
| 11,822,395 B2* | 11/2023 | Tan | H05K 9/0092 |
| 11,956,912 B2* | 4/2024 | Kim | G06F 1/1679 |
| 2004/0266502 A1 | 12/2004 | Holtorf et al. | |
| 2008/0153329 A1* | 6/2008 | Lin | H01Q 1/2258 |
| | | | 439/108 |
| 2008/0266198 A1 | 10/2008 | Walker et al. | |
| 2008/0300031 A1 | 12/2008 | Cho et al. | |
| 2009/0303137 A1* | 12/2009 | Kusaka | G06F 1/1616 |
| | | | 343/702 |
| 2011/0216492 A1* | 9/2011 | Murakata | G06F 1/16 |
| | | | 343/702 |
| 2011/0216510 A1* | 9/2011 | Matsumura | H02G 3/00 |
| | | | 361/733 |
| 2011/0249379 A1* | 10/2011 | Shirasaka | G06F 1/1656 |
| | | | 361/679.01 |
| 2012/0176755 A1* | 7/2012 | Malek | H05K 9/0032 |
| | | | 361/752 |
| 2013/0048368 A1* | 2/2013 | Malek | H04M 1/0274 |
| | | | 174/350 |
| 2014/0043781 A1* | 2/2014 | Matsumura | H05K 5/06 |
| | | | 361/752 |
| 2014/0218606 A1* | 8/2014 | Malek | H04M 1/0277 |
| | | | 361/753 |
| 2015/0092334 A1* | 4/2015 | Hayashida | G06F 1/1601 |
| | | | 361/679.21 |
| 2017/0245386 A1 | 8/2017 | Park | |
| 2020/0267861 A1* | 8/2020 | Kim | G06F 1/1615 |
| 2020/0267868 A1* | 8/2020 | Park | H01R 12/716 |
| 2022/0129046 A1 | 4/2022 | Baek et al. | |
| 2023/0021614 A1* | 1/2023 | Park | H01Q 1/526 |
| 2023/0029875 A1* | 2/2023 | Tan | G06F 1/203 |
| 2023/0035512 A1* | 2/2023 | Tan | H05K 7/20454 |
| 2023/0081207 A1* | 3/2023 | Kim | H04M 1/0268 |
| | | | 361/749 |

FOREIGN PATENT DOCUMENTS

| | | |
|---|---|---|
| JP | 5099642 B2 | 12/2012 |
| KR | 100808576 B1 | 2/2008 |
| KR | 1020080108842 A | 12/2008 |
| KR | 20170097917 A | 8/2017 |
| KR | 10-1871820 B1 | 6/2018 |
| KR | 1020180088172 A | 8/2018 |
| KR | 1020190137433 A | 12/2019 |
| KR | 1020200100490 A | 8/2020 |
| KR | 1020200101116 A | 8/2020 |

OTHER PUBLICATIONS

International Search Report mailed on Jan. 31, 2023 and issued in corresponding international patent application No. PCT/KR2022/016185, 7 pp.

* cited by examiner

ELECTRONIC DEVICE INCLUDING HINGE DEVICE

CROSS REFERENCE TO RELATED APPLICATIONS

This application is a PCT-Bypass Continuation of International Patent Application No. PCT/KR2022/016185, filed on Oct. 21, 2022, which claims priority to Korean Patent Application No. 10-2021-0140860, filed on Oct. 21, 2021, and all the benefits accruing therefore under 35 U.S.C. § 119, the contents of which are hereby incorporated by reference for all purposes as if fully set forth herein.

TECHNICAL FIELD

Various embodiments of the disclosure relate to an electronic device including a hinge device.

BACKGROUND ART

Various types of electronic devices are being developed due to user needs and development of technology. Among such devices, a foldable electronic device, may be foldable and thus convenient to carry. When the electronic device is unfolded, a display thereof may become larger or a separate input device may appear, which may make it convenient to use the electronic device.

DISCLOSURE OF INVENTION

Technical Problem

In a foldable electronic device, a plurality of housings may be rotatable by using a hinge device. The plurality of housings may be physically connected to each other via the hinge device, and may be electrically connected via an electrical connection member. The electrical connection member electrically connecting the plurality of housings and various components thereof to each other, may be included in the hinge device. For example, a cable as the electrical connection member connecting the plurality of housings and various components thereof to each other may be included in the hinge device.

However, when the cable is not fixed within the hinge device, the cable may get jammed during assembly of the electronic device. In particular, as electronic devices become slimmer, the positions of internal components are changed, and thus a number of cables included in the hinge device is increased. Thus, owing to the increased number of cables within the hinge device, the frequency of cable jamming during assembly is also increased.

Solution to Problem

An electronic device according to an embodiment of the disclosure may include a first housing, a second housing, a hinge device that foldably couples the first housing and the second housing to each other, and at least one electrical connection member that connects a component included in the first housing and a component included in the second housing, where the hinge device may include at least one hinge, at least one first hinge bracket that connects the hinge and the first housing to each other, at least one second hinge bracket that connects the hinge and the second housing to each other, and a support that supports the at least one electrical connection member, and where the support may be fixed via the same fastening structure as the first hinge bracket.

A hinge device according to an embodiment may include at least one hinge, at least one first hinge bracket that connects the hinge and a first housing to each other, at least one second hinge bracket that connects the hinge and a second housing, and a support that supports at least one electrical connection member, where the support may be fixed via the same fastening structure as the first hinge bracket.

Advantageous Effects of Invention

According to various embodiments of the disclosure, a cable as an electrical connection member and disposed in a hinge device is fixedly coupled within the hinge device, via a component of the hinge device.

According to various embodiments of the disclosure, since the cable disposed in the hinge device is fixed within the hinge device, the frequency of cable jamming in the housing (e.g., within the hinge device) is reduced and assembly of a device including the hinge device is simplified.

According to various embodiments of the disclosure, an outer sheath of an antenna cable as the electrical connection member and disposed in a hinge device may be connected to a ground (e.g., electrically grounded) via a fixing member such as a clamp. Thus, (electrical) noise components flowing into the outer sheath of the antenna cable are connectable to the ground. When the noise component flowing through the outer sheath of the antenna cable is grounded, the performance of the antenna is improved since the parasitic resonance components of signals are reduced.

MODE FOR THE INVENTION

Figure 1:
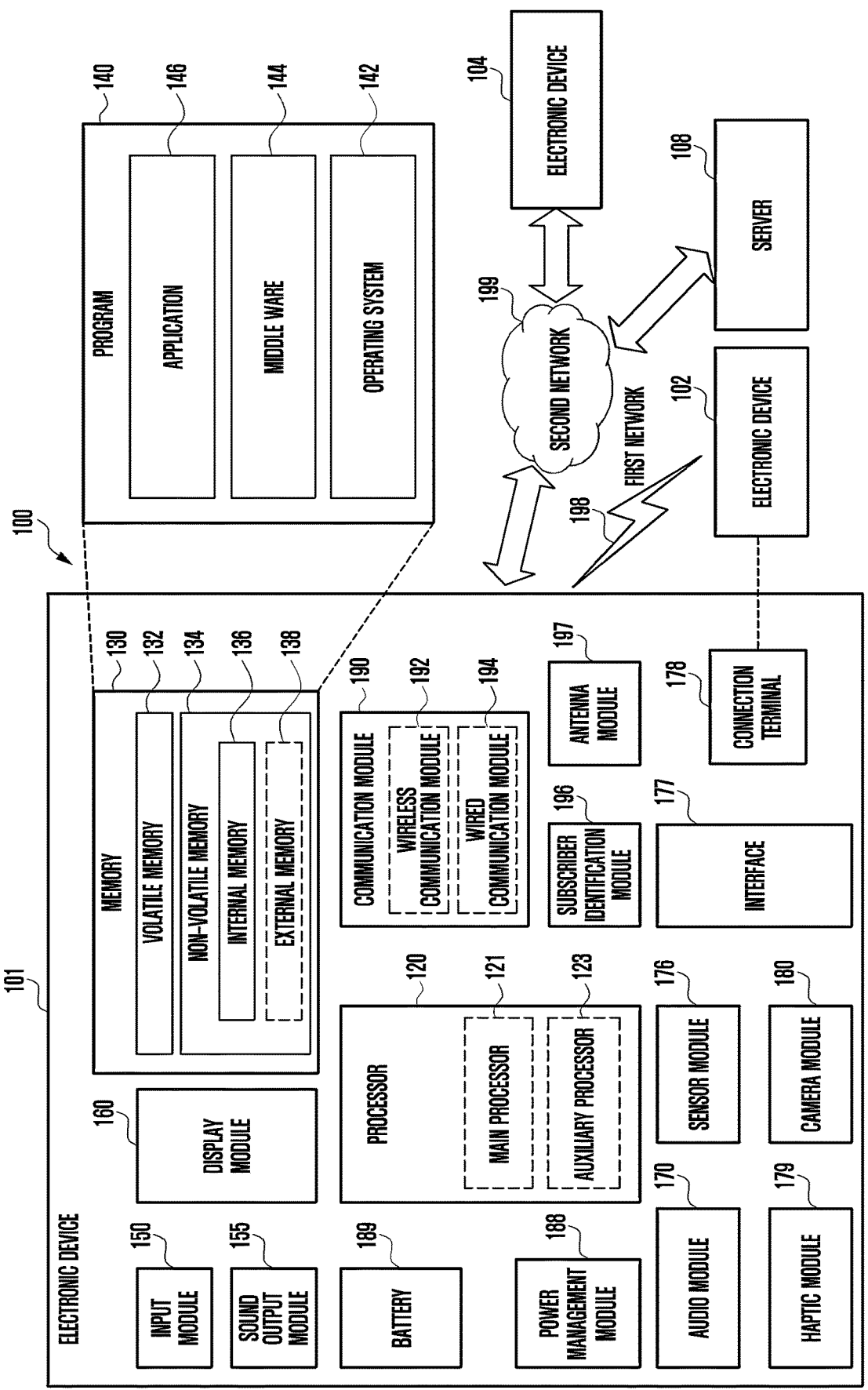
FIG. 1 is a block diagram of an electronic device according to various embodiments in a network environment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input 1module 150, a sound output 1module 155, a display 1module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the 11 connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input 1module 150 may receive a command or data to be used by another component (e.g., the processor 120) of the electronic device 101, from the outside (e.g., a user) of the electronic device 101. The input 1module 150 may include, for example, a microphone, a mouse, a keyboard, a key (e.g., a button), or a digital pen (e.g., a stylus pen).

The sound output 1module 155 may output sound signals to the outside of the electronic device 101. The sound output 1module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 1module 160 may visually provide information to the outside (e.g., a user) of the electronic device 101. The display 1module 160 may include, for example, a display, a hologram device, or a projector and control circuitry to control a corresponding one of the display, hologram device, and projector. According to an embodiment, the display 1module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input 1module 150, or output the sound via the sound output 1module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
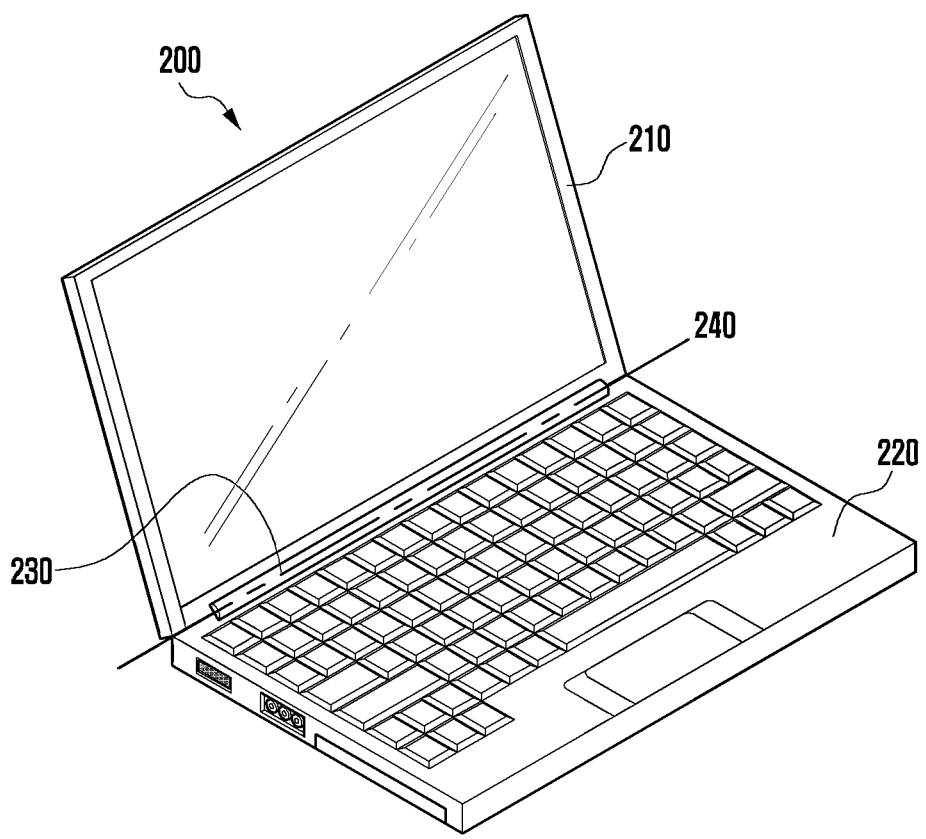
FIG. 2 is a perspective view of an electronic device including a hinge device according to various embodiments.

FIG. 2 is a perspective view of an electronic device including a hinge device according to various embodiments.

Referring to FIG. 2, an electronic device 200 according to various embodiments may include a first housing 210, a second housing 220, and a hinge device 230 that couples the first housing 210 and the second housing 220 to each other. The second housing 220 may be disposed flat in a plane defined by a first direction and a second direction crossing each other. A thickness of the electronic device 200 and various components or layers thereof, may be taken along a third direction crossing each of the first and second directions (e.g., to define a thickness direction). A plan view may be along the third direction, as a view of the plane defined by the first and second directions, without being limited thereto.

According to various embodiments, the first housing 210 may be variously referred to as a first main body, a first electronic device, an upper plate or a display device, and the second housing 220 may be variously referred to as a second main body, a second electronic device, a lower plate or an input device. The first housing 210 may include a first top surface, a first bottom surface facing away from the first top surface (e.g., opposite to the first top surface), and a first side member surrounding at least a portion of a space between the first top and bottom surfaces. That is, the side member may define a space together with the top surface and the bottom surface. The second housing 220 may include a second top surface, a second bottom surface facing away from the second top surface, and a second side member surrounding at least a portion of a space between the second top and bottom surfaces. According to an embodiment, the first housing 210 may include a display (e.g., a touch screen), a camera, a microphone and/or a sensor, and the second housing 220 may include a keyboard in which a plurality of keys are arranged, a touch pad adjacent to the keyboard and/or a main board to which all components included in the first housing 210 and the second housing 220 are connected (e.g., a main circuit board).

According to various embodiments, the hinge device 230 may couple the first housing 210 and the second housing 220 to each other to make the first housing 210 and the second housing 220 foldable (or unfoldable). The first housing 210 and the second housing 220 may be configured to be rotatable about an axis 240 by an angle in the range of 0 degrees to about 360 degrees with the help of the hinge device 230. Referring to FIG. 2, the axis 240 may extend in (or along) the first direction (or the second direction).

FIG. 2 illustrates the hinge device 230 as including a separate hinge housing, but the hinge device 230 may not include the separate housing, and may be included in the first housing 210 and/or the second housing 220.

According to various embodiments, a notebook computer, a tablet PC, and a smartphone may be examples of the electronic device including a hinge device.

Figure 3A:
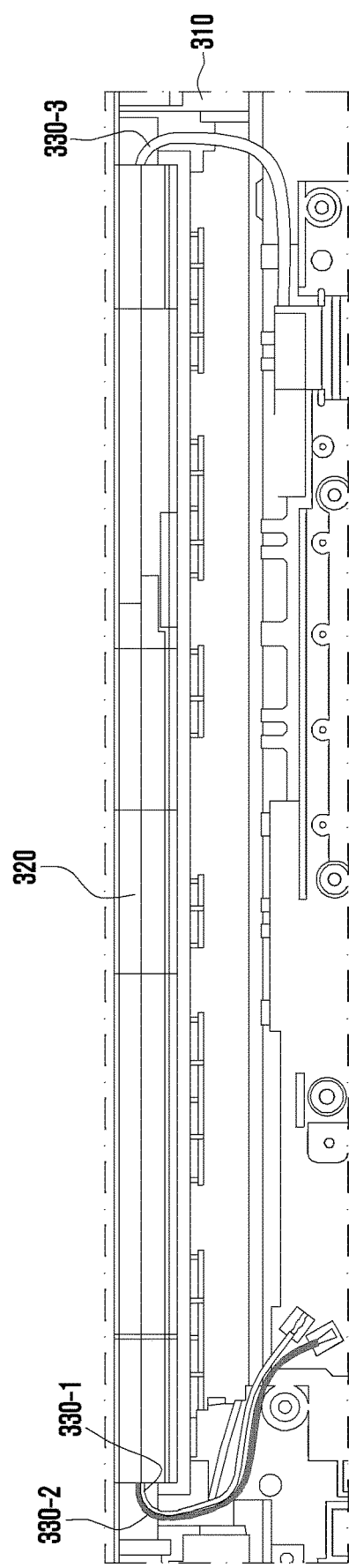
FIGS. 3A to 3C illustrate a hinge device according to various embodiments.
Figure 3B:
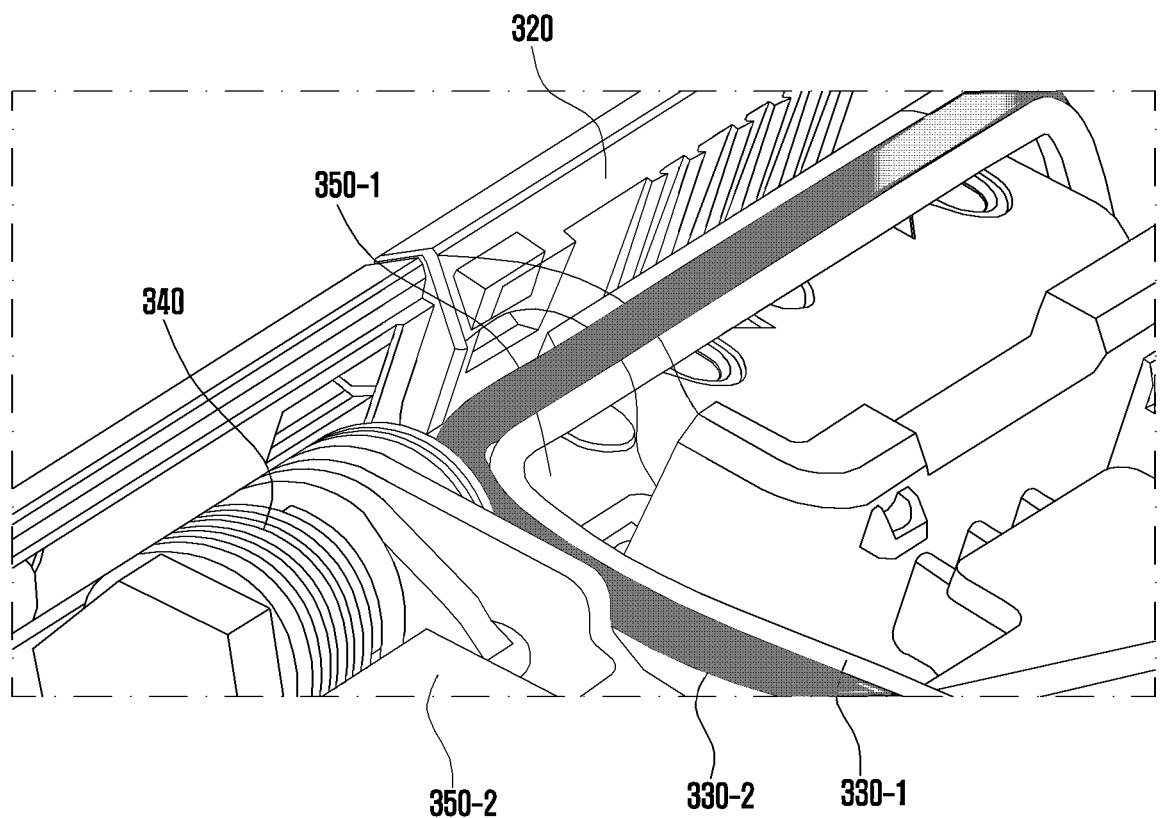
Figure 3C:
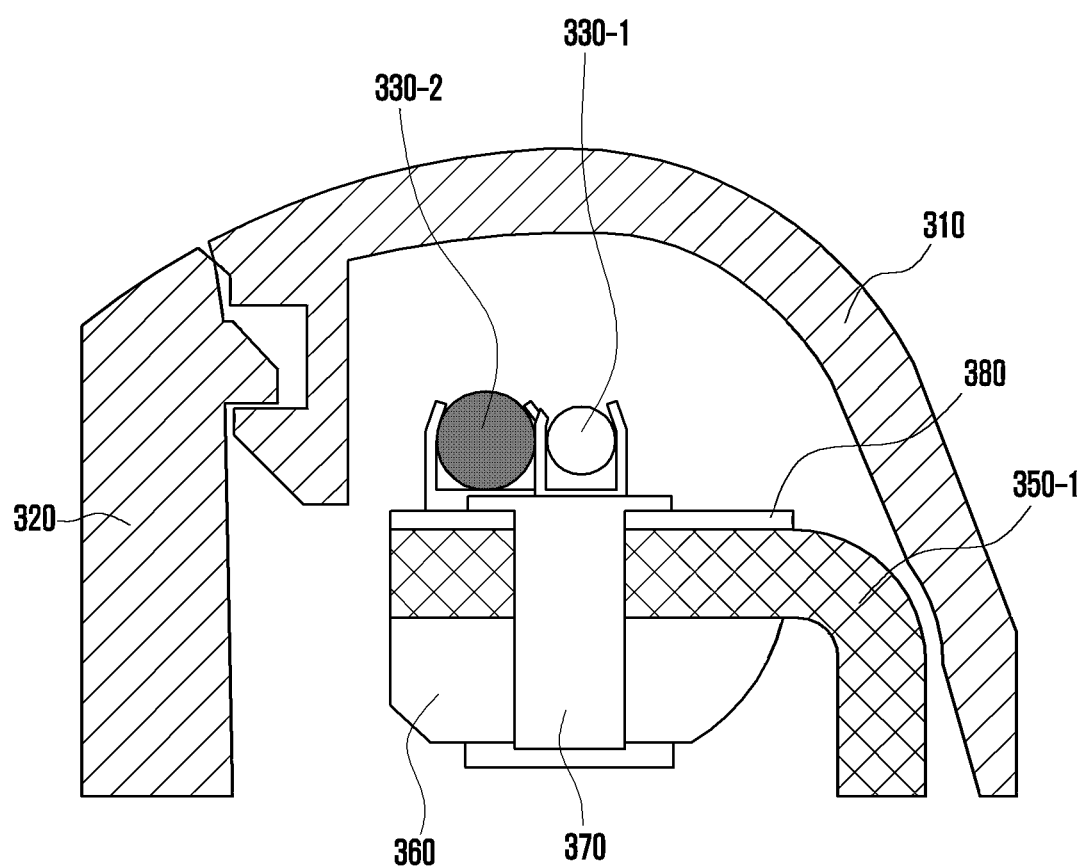

FIGS. 3A to 3C illustrate a hinge device according to various embodiments. Various structures and components discussed for one of the housing (e.g., a first housing 310 or the second housing) may be equally applied to the other housing among the first and second housings, without being limited thereto.

FIG. 3A is a plan view illustrating a hinge device (e.g., the hinge device 230 in FIG. 2) connected to the first housing 310 of the electronic device. Referring to FIG. 3A, the hinge device 230 may be included in the housing 320. According to an embodiment, a hinge may be referred to as a hinge device, including the housing 320 surrounding the hinge. Hereinafter, for convenience of description, the housing 320 surrounding the hinge device 230 will be referred to as a hinge housing, but a first housing (e.g., the first housing 210 in FIG. 2), a second housing (e.g., the second housing 220 in FIG. 2), or a housing to which the housings are coupled may be the hinge housing 320. The hinge housing 320 may include therein a member that connects one component (e.g., a first component) included in the first housing 310 and one component (e.g., a second component) included in the second housing (not illustrated) to each other. The first and second component may be an electrical component, without being limited thereto.

The member that connects the one component included in the first housing 310 and the one component included in the second housing (not illustrated) to each other may be an electrical connection member. For example, when a liquid crystal display (LCD) is included in the first housing 310 and a processor that controls the LCD is included in the second housing (not illustrated), the electrical connection member may be an LCD cable 330-3. As another example, when a camera is included in the first housing 310 and a processor that controls the camera is included in the second housing (not illustrated), an electrical connection member of the camera may be added to the LCD cable 330-3. As another example, when an antenna is included in the first housing 310 and a communication processor is included in the second housing (not illustrated), the electrical connection member may be antenna cables 330-1 and 330-2 (e.g., a plurality of electrical connection members or a plurality of cables).

FIG. 3B is an enlarged perspective view of a portion of the hinge device 230. Referring to FIG. 3B, the hinge device 230 may include a hinge 340, a first hinge bracket 350-1 that connects the hinge 340 to the first housing (e.g., the first housing 210 in FIG. 2), and a second hinge bracket 350-2 that connects the hinge 340 to the second housing (e.g., the second housing 220 in FIG. 2). The first hinge bracket 350-1 and the second hinge bracket 350-2 may be rotatable (e.g., rotate) in opposite directions from each other with respect to one axis. The first housing 210 and the second housing 220 may also be connected to the first hinge bracket 350-1 and the second hinge bracket 350-2, respectively, and may rotate in opposite directions to be foldable with respect to an axis.

FIG. 3C is a cross-sectional view of the hinge device of FIG. 3B. Referring to FIG. 3C, the first hinge bracket 350-1, a component 360 of the first housing, and a connection member 370 may be included in the hinge housing 320 of the hinge device 230. The first hinge bracket 350-1 and the one component 360 of the first housing may be fixed to each other via the connection member 370. The connection member 370 may include, for example, a screw or a nut together with a screw. The connection member 370 may be disposed to penetrate a thickness of the first hinge bracket 350-1 and a thickness of the one component 360 of the first housing. The first housing 310 which is rotated (e.g., such as by an external force provided from a user), may rotate the first hinge bracket 350-1 connected to the one component 360 of the first housing. That is, components of the electronic device 200 may be rotatable together with each other, like the first housing 310 together with the first hinge bracket 350-1 and the component 360 connected thereto.

In an embodiment, the one component 360 of the first housing in the hinge housing 320 may include a threaded groove. The connection member 370 may be, for example, a threaded screw, and may be inserted into the groove to fix the first hinge bracket 350-1 and/or the PCB 380 of the support to the one component 360 of the first housing.

According to an embodiment, the hinge housing 320 may include (or define) a space therein. The hinge housing 320 may include a member that interconnects the first housing 310 and the second housing (the second housing 220 in FIG. 2), such as an LCD cable (e.g., the LCD cable 330-3 in FIG. 3A) and/or the antenna cables 330-1 and 330-2 by using the space therein.

According to various embodiments, the hinge housing 320 may be configured integrally with the first housing 210 or the second housing 220. For example, the hinge housing 320 may be configured integrally with the second housing 220. In this case, the hinge device 230 except for the hinge housing 320 may be included in the internal space of the second housing 220.

Figure 4:
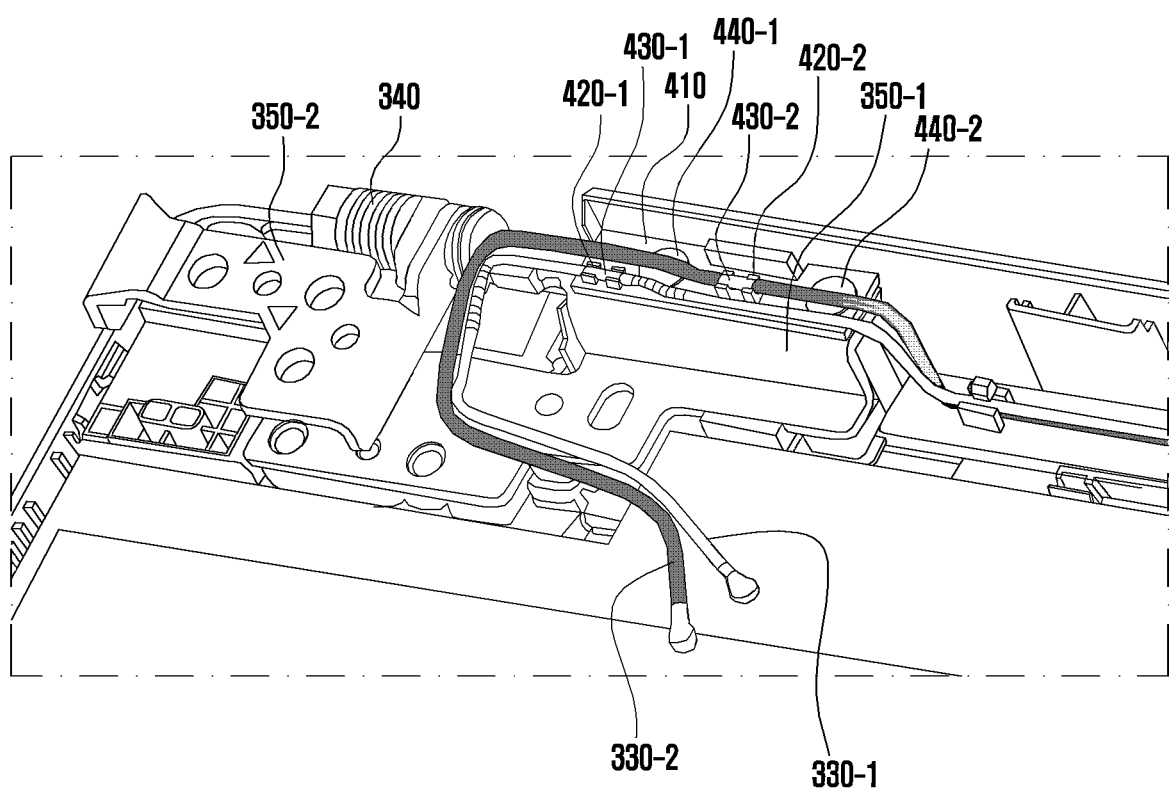
FIG. 4 is a perspective view of a portion of the hinge device according to various embodiments.

FIG. 4 is an exploded perspective view of a portion of the hinge device according to various embodiments.

Referring to FIG. 4, the hinge device may include a hinge 340, a first hinge bracket 350-1, a second hinge bracket 350-2, and a support. As described above with reference to FIG. 3, the first hinge bracket 350-1 may be connected to the first housing, and the second hinge bracket 350-2 may be connected to the second housing. The first hinge bracket 350-1 and the second hinge bracket 350-2 may be connected respectively to the first housing and the second housing by using, for example, respective screws. The first hinge bracket 350-1 and the second hinge bracket 350-2 may rotate in opposite directions with respect to one axis. The first hinge bracket 350-1 and the second hinge bracket 350-2 may form a rotation angle between the two brackets of 0 degrees to about 360 degrees by rotation. Since the first hinge bracket 350-1 and the second hinge bracket 350-2 are each connected to the hinge 340 to be rotatable, the first and second hinge brackets may be referred to as movable brackets.

According to various embodiments, the hinge device may not be exposed to the exterior (e.g., of the electronic device 200) by the hinge housing (e.g., the hinge housing 320 in FIGS. 3A to 3C), the first housing, and/or the second housing. In an embodiment, the hinge housing 320, the first housing, the second housing, or a combination of some of the housings may be configured to surround the hinge device such that the hinge device is not exposed to the exterior. Hereinafter, it is described that the hinge device is surrounded by the hinge housing for convenience of description, but is not limited thereto.

According to an embodiment, the housing surrounding the hinge device may be a component of the hinge device, but may not be an essential component.

According to various embodiments, the support may be connected (or fixed or attached) to one component of the hinge device to support at least one electrical connection member, for example, the antenna cables 330-1 and 330-2. Referring to FIG. 4, the support may include fixing members 420-1 and 420-2 that are capable of fixing at least one electrical connection member and a printed circuit board (PCB) that fixes the members 420-1 and 420-2 to the first hinge bracket 350-1. The fixing members 420-1 and 420-2 that fix the at least one electrical connection member may be, for example, clips. FIG. 4 may be a drawing illustrating the state in which the antenna cables 330-1 and 330-2, which are electrical connection members, are fixed by clips 420-1 and 420-2, which are fixing members, respectively.

FIG. 4 illustrates the state in which one antenna cable is fixed by one clip, but one antenna cable may be fixed by a plurality of clips. According to an embodiment, at least one of the size, shape, thickness, length, and material of the fixing members may vary depending on the characteristics of the electrical connection member. For example, when the electrical connection member is thick, the size, thickness, and length of the fixing members may be increased, and when the electrical connection member is thin, the size, thickness, and length of the fixing member may be decreased. That is, the size, thickness, and length of the fixing members may correspond to the size, thickness, and length of the electrical connection member. According to another embodiment, the fixing members may be the same regardless of the electrical connection member.

According to various embodiments, the exterior of at least one electrical connection member 330-1 or 330-2 may be grounded (e.g., electrically grounded) in order to prevent noise and electrical noise from being introduced into the at least one electrical connection member 330-1 or 330-2. A partial region of at least one electrical connection member 330-1 or 330-2 in which the sheath is conductive removed is clamped or soldered by using a metallic member 430-1 or 430-2 to be connected to the support and the first hinge bracket 350-1. This will be described in detail with reference to FIG. 5.

According to various embodiments, the hinge device may further include a member that fixes the support to the first hinge bracket 350-1. Referring to FIG. 4, the member that fixes the support and the first hinge bracket 350-1 may be screws 440-1 and 440-2.

In the above description, the support is connected, fixed, or attached to one component of the hinge device, but the support may be connected, fixed, or attached to the hinge housing, the first housing, and/or the second housing. For example, the hinge device may include at least one fixing member 420-1 or 420-2 capable of fixing at least one electrical connection member to the first housing 210 or the second housing 220 and a printed circuit board (PCB) that fixes the members 420-1 or 420-2 to the first hinge bracket 350-1.

Figure 5:
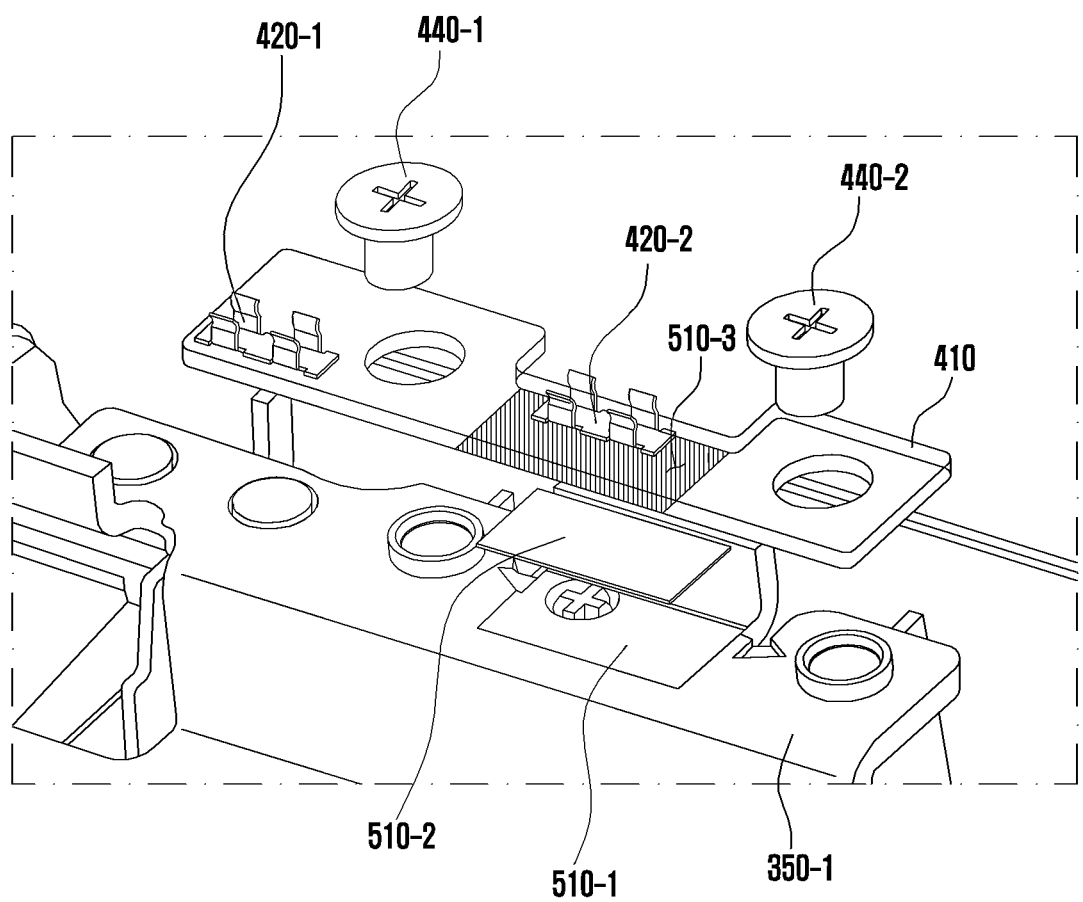
FIG. 5 is an exploded perspective view of a portion of the hinge device according to various embodiments.

FIG. 5 is an exploded perspective view of a portion of the hinge device according to various embodiments.

According to various embodiments, at least one electrical connection member (not illustrated) may be connected to and fixed to at least one component of the hinge device. The hinge device may include a support that supports the at least one electrical connection member to fix the at least one electrical connection member.

Referring to FIG. 5, the support may include fixing members 420-1 and 420-2 that are capable of fixing at least one electrical connection member and a PCB 410 that fixes the fixing members 420-1 and 420-2 to the first hinge bracket 350-1. The fixing members 420-1 and 420-2 may be fixed to prevent the electrical connection member from moving. The fixing members 420-1 and 420-2 are not limited in size, shape, and material, and may be any fixing members as long as they can fix the electrical connection member. According to an embodiment, the fixing members 420-1 and 420-2 may be clips. The PCB 410 which is fixed to the first hinge bracket 350-1 may be considered as including the support (e.g., fixing members 420-1 and 420-2) so as to fix the fixing members 420-1 and 420-2 to the first hinge bracket 350-1. The support (e.g., fixing members 420-1 and 420-2) may be a portion of the PCB 410 which is fixed in position relative to a remainder of the PCB 410. In an embodiment, a portion of the PCB 410 may define the support or a separate support may be fixed to the PCB 410. The support may be directly coupled to the PCB 410, without being limited thereto.

According to various embodiments, one surface of a PCB 410 included in the support and one surface of the first hinge bracket 350-1 may be brought into contact with and connected to each other (e.g., facing surfaces). The PCB 410 and the first hinge bracket 350-1 may be connected to each other electrically as well as physically. As being in contact, elements may form an interface therebetween, without being limited thereto. The PCB 410 may include a conductive region 510-3 to ground the electrical connection member. The conductive region 510-3 of the PCB 410 may be a region processed with a conductive copper foil. The conductive region 510-3 may be at least a partial region of the PCB 410. The first hinge bracket 350-1 may also include a conductive region 510-1. The conductive region 510-1 may correspond to the conductive region 510-3. As corresponding, elements may be related in position, location, size, etc., without being limited thereto. For example, when the first hinge bracket 350-1 includes a coated metallic member, the conductive region 510-1 of the first hinge bracket 350-1 may be a region that is processed with a laser to remove the coated material at a portion of the first hinge bracket 350-1. That is, the various conductive regions may be exposed to outside the various components (e.g., the conductive region 510-3 of the PCB 410 may be exposed to outside the PCB 410, the conductive region 510-1 of the first hinge bracket 350-1 may be exposed to outside the first hinge bracket 350-1, etc.).

A conductive member such as a conductive tape 510-2 may be disposed between the PCB 410 and the first hinge bracket 350-1 to electrically interconnect the PCB and the first hinge bracket. The conductive region 510-3 of the PCB 410, the conductive region 510-1 of the first hinge bracket 350-1, and the conductive tape 510-2 may be disposed to at least partially overlap each other along a thickness direction, and respective sizes and overlapping regions may not be limited.

According to various embodiments, the PCB 410 and the first hinge bracket 350-1 included in the support may be fixed in position relative to each other and/or relative to the housing structure of the electronic device 200, through a same fastening structure. For example, the PCB 410 and the first hinge bracket 350-1 may be fixed by a same fastening structure of the screws 440-1 and 440-2 that each penetrate a thickness of the PCB 410 and the first hinge bracket 350-1. The screws 440-1 and 440-2 may be further fixed in location via nuts.

According to various embodiments, when the fixing members 420-1 and 420-2 are capable of being directly fixed to the first hinge bracket 350-1 and the electrical connection member is capable of being grounded via the fixing members 420-1 and 420-2, the support may not include the PCB 410.

Figure 6:
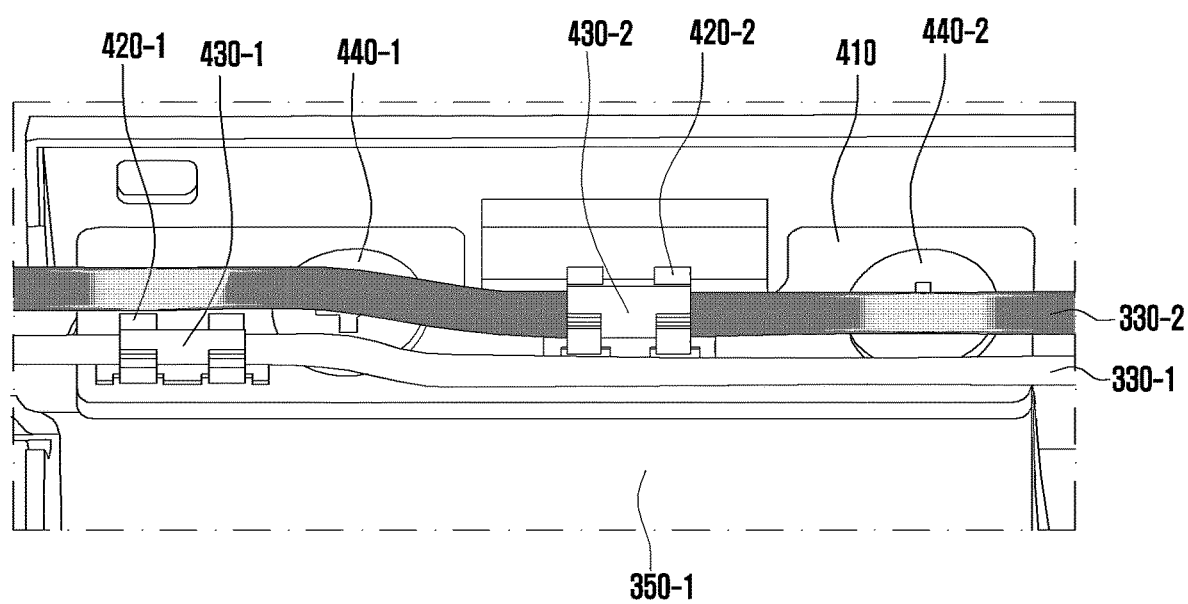
FIG. 6 is a top plan view illustrating a portion of a hinge device to which an electrical connection member is fixed according to various embodiments.

FIG. 6 is an enlarged perspective view illustrating a portion of a hinge device to which an electrical connection member is fixed according to various embodiments.

Referring to FIG. 6, as electrical connection members, the first antenna cable 330-1 and the second antenna cable 330-2 may be fixed to the hinge device. The first antenna cable 330-1 and the second antenna cable 330-2 may be fixed to the hinge device by the support. The support may include a first fixing member 420-1 and a second fixing member 420-2 that directly fix the first antenna cable 330-1 and the second antenna cable 330-2, respectively to the PCB 410 that in turn fixes the first fixing member 420-1 and the second fixing member 420-2 to the first hinge bracket 350-1. The first fixing member 420-1 and the second fixing member 420-2 that directly fix the first antenna cable 330-1 and the second antenna cable 330-2 may be, for example, clips. The second fixing member 420-2 may correspond to the conductive region 510-3 while the first fixing member 420-1 may correspond to a non-conductive region of the PCB 410 which is adjacent to the conductive region 510-3. The PCB 410 may be fixed to the first hinge bracket 350-1 by screws 440-1 and 440-2. The screws 440-1 and 440-2 may penetrate the PCB 410 and the first hinge bracket 350-1 to fix the PCB 410 to the first hinge bracket 350-1.

According to various embodiments, when the electrical connection member is an antenna cable, the first antenna cable 330-1 and the second antenna cable 330-2 may be clamped to the support by using metallic members 430-1 and 430-2 in order to improve the performance of antennas. A portion of the electrical connection member which is clamped to the metallic members 430-1 and 430-2 may be fixed by the first fixing member 420-1 or the second fixing member 420-2. The clamped portion may be soldered or connected to the fixing member by removing a portion of the sheath of the cable.

In FIG. 6, each of the first antenna cable 330-1 and the second antenna cable 330-2 is illustrated as being fixed by one fixing member, but one electrical connection member may be fixed by a plurality of fixing members. In addition, the size, shape, and material of the fixing member may vary depending on the characteristics of the electrical connection member. For example, the fixing member of a less ductile electrical connection member may be made of a stronger material than the fixing member of a highly ductile connection member, and may have a larger size and a greater thickness.

Figure 7:
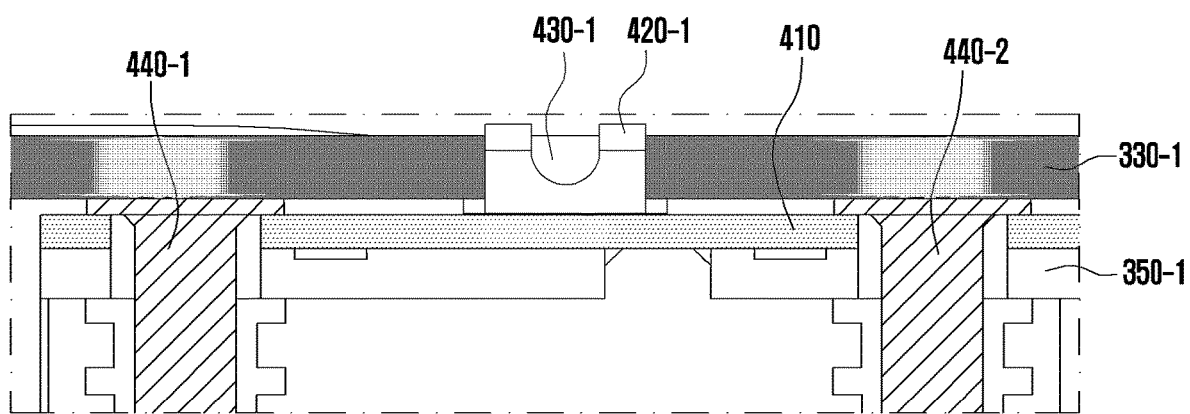
FIG. 7 is a cross-sectional view of a portion of a hinge device to which an electrical connection member is fixed according to various embodiments.

FIG. 7 is a cross-sectional view of a portion of a hinge device to which an electrical connection member is fixed according to various embodiments.

Referring to FIG. 7, a cable 330-1, which is an electrical connection member, may be disposed on the uppermost layer. A partial region of the cable 330-1 may be clamped by a metallic member 430-1. The portion clamped by the metallic member 430-1 may be fixed to a PCB 410 by the fixing member 420-1.

According to various embodiments, the bottom surface that is one surface of the PCB 410 which is closest to the first hinge bracket 350-1, may come into contact with the top surface that is one surface of the first hinge bracket 350-1 which is closest to the PCB 410, along the thickness direction. Partial regions of the surfaces brought into contact with each other may be electrically connected regions (i.e., conductive regions). The conductive region of the PCB (e.g., conductive region 510-3 in FIG. 5) may be a region in which a conductive copper foil is processed on the PCB 410. The conductive region of the first hinge bracket 350-1 (e.g., conductive region 510-1 in FIG. 5) may be, for example, a region from which a coating is removed when a metallic member of the first hinge bracket 350-1 is coated (e.g., with a non-conductive member or other coating. The first hinge bracket 350-1 may be processed with a laser in order to remove the coating to expose the metallic member. The conductive region of the PCB 410 and the conductive region of the first hinge bracket 350-1 may be electrically connected to each other by a conductive tape (e.g., conductive tape 510-2 in FIG. 5) and grounded.

According to various embodiments, the PCB 410 and the first hinge bracket 350-1 may be physically fixed to each other and/or fixed in a position within the electronic device 200. The PCB 410 and the first hinge bracket 350-1 may be fixed by screws 440-1 and 440-2 that penetrate the PCB 410 and the first hinge bracket 350-1. For example, the screws 440-1 and 440-2 may be threaded screws. As another example, the PCB 410 and the first hinge bracket 350-1 may be fixed by a screw that penetrates the PCB 410 and the first hinge bracket 350-1, and a nut.

An electronic device according to an embodiment of the disclosure may include a first housing, a second housing, a hinge device that foldably couples the first housing and the second housing to each other, and at least one electrical connection member that connects a component (e.g., an electrical component) included in the first housing and a component (e.g., an electrical component) included in the second housing, where the hinge device may include at least one hinge, at least one first hinge bracket that connects the hinge and the first housing to each other, at least one second hinge bracket that connects the hinge and the second housing to each other, and a support that supports the at least one electrical connection member, and where the support may be fixed via the same fastening structure as the first hinge bracket.

In the electronic device according to an embodiment, the at least one electrical connection member may include an antenna cable, and the antenna cable may be grounded (e.g., electrically grounded) via the support.

In the electronic device according to an embodiment, the support and the first hinge bracket may be fixed by a fixing member such as a screw.

In the electronic device according to an embodiment, the support may fix the at least one electrical connection member to the hinge device. In the electronic device according to an embodiment, the support may include a fixing member configured to fix the at least one electrical connection member, and a printed circuit board (PCB) configured to fix the fixing member to the first hinge bracket.

In the electronic device according to an embodiment, the PCB may include a conductive region, and the PCB and the first hinge bracket may be connected to each other with a conductive tape at the conductive region.

In the electronic device according to an embodiment, a region of the first hinge bracket connected to the conductive tape may be a region from which a coating of the first hinge bracket is removed.

In the electronic device according to an embodiment, the conductive region of the PCB, the conductive tape, and the region from which the coating of the first hinge bracket is removed may at least partially overlap each other.

In the electronic device according to an embodiment, the fixing member may be a clip.

In the electronic device according to an embodiment, at least one of a size, shape, thickness, length, and material of the fixing member may be determined depending on a characteristic of the electrical connection member.

A hinge device according to an embodiment may include at least one hinge, at least one first hinge bracket that connects the hinge and a first housing to each other, at least one second hinge bracket that connects the hinge and a second housing, and a support that supports at least one electrical connection member, where the support may be fixed via the same fastening structure as the first hinge bracket.

In the hinge device according to an embodiment, the at least one electrical connection member may include an antenna cable, and the antenna cable may be grounded via the support.

In the hinge device according to an embodiment, the support and the first hinge bracket may be fixed by using a screw.

In the hinge device according to an embodiment, the support may fix the at least one electrical connection member to the hinge device.

In the hinge device according to an embodiment, the support may include a fixing member configured to fix the at least one electrical connection member, and a printed circuit board (PCB) configured to fix the fixing member to the first hinge bracket.

In the hinge device according to an embodiment, the PCB may include a conductive region, and the PCB and the first hinge bracket may be connected to each other with a conductive tape.

In the hinge device according to an embodiment, the region of the first hinge bracket connected to the conductive tape may be a region from which a coating is removed.

In the hinge device according to an embodiment, the conductive region of the PCB, the conductive tape, and the region from which the coating of the first hinge bracket is removed may at least partially overlap each other.

In the hinge device according to an embodiment, the fixing member may be a clip.

In the hinge device according to an embodiment, at least one of a size, shape, thickness, length, and material of the fixing member may be determined depending on a characteristic of the electrical connection member.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements.

A singular form of a noun corresponding to an item may include one or more of the items, unless the relevant context clearly indicates otherwise. As used herein, a reference number may indicate a singular element or a plurality of the element. For example, a reference number labeling a singular form of an element within the drawing figures may be used to reference a plurality of the singular element within the text of specification.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As used herein, such terms as "a first", "a second", "the first", and "the second" may be used to simply distinguish a corresponding element from another, and does not limit the elements in other aspect (e.g., importance or order).

It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element. It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Where, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. An electronic device comprising:
a first housing including a first component;
a second housing including a second component;
a hinge device which foldably couples the first housing and the second housing to each other; and
at least one electrical connection member which connects the first component included in the first housing and the second component included in the second housing to each other, the at least one electrical connection member being electrically grounded to the hinge device,
wherein the hinge device includes:
at least one hinge;
at least one first hinge bracket which connects the hinge and the first housing to each other;
at least one second hinge bracket which connects the hinge and the second housing to each other;
a fastening structure which fixes the first hinge bracket to the first housing; and
a support which supports the at least one electrical connection member, and
wherein the support is fixed to the first housing via the fastening structure which fixes the first hinge bracket to the first housing.

2. The electronic device of claim 1, wherein
the at least one electrical connection member includes an antenna cable, and
the antenna cable is electrically grounded to the hinge device at the support.

3. The electronic device of claim 1, wherein the fastening structure which fixes the support to the first housing and fixes the first hinge bracket to the first housing includes a screw.

4. The electronic device of claim 1, wherein
the support fixes the at least one electrical connection member to the hinge device, and
the at least one electrical connection member is electrically grounded to the hinge device at the support.

5. The electronic device of claim 1, wherein
the support includes both:
a fixing member configured to fix the at least one electrical connection member, and
a printed circuit board configured to fix the fixing member to the first hinge bracket, and
the at least one electrical connection member is electrically grounded to the hinge device at the fixing member of the support.

6. The electronic device of claim 5, wherein
the printed circuit board includes a conductive region, and
the printed circuit board and the first hinge bracket are connected to each other with a conductive tape.

7. The electronic device of claim 6, wherein a region of the first hinge bracket connected to the conductive tape is a region from which a coating of the first hinge bracket is removed.

8. The electronic device of claim 7, wherein the conductive region of the printed circuit board, the conductive tape, and the region of the first hinge bracket from which the coating of the first hinge bracket is removed, at least partially overlap each other.

9. The electronic device of claim 5, wherein the fixing member is a clip.

10. The electronic device of claim 5, wherein at least one of a size, shape, thickness, length and material of the fixing member is determined depending on a characteristic of the electrical connection member.

11. A hinge device comprising:
at least one hinge;
at least one first hinge bracket which connects the hinge and a first housing of an electronic device to each other;
at least one second hinge bracket that connects the hinge and a second housing of the electronic device;
each of the first housing and second housing including an electrical component of the electronic device; and
a support which supports at least one electrical connection member connecting the electrical components of the first and second housings to each other,
wherein
the at least one electrical connection member is electrically grounded to the hinge device,
the first hinge bracket is fixed to the first housing by a fastening structure, and
the support is fixed to the first housing via the fastening structure which fixes the first hinge bracket to the first housing.

12. The hinge device of claim 11, wherein
the at least one electrical connection member includes an antenna cable, and
the antenna cable is electrically grounded to the hinge device at the support.

13. The hinge device of claim 11, wherein the fastening structure which fixes the support to the first housing and fixes the first hinge bracket to the first housing includes a screw.

14. The hinge device of claim 11, wherein
the support fixes the at least one electrical connection member to the hinge device, and
the at least one electrical connection member is electrically grounded to the hinge device at the support.

15. The hinge device of claim 11, wherein
the support includes both:
a fixing member configured to fix the at least one electrical connection member, and
a printed circuit board configured to fix the fixing member to the first hinge bracket, and
the at least one electrical connection member is electrically grounded to the hinge device at the fixing member of the support.

16. The hinge device of claim 15, wherein
the printed circuit board includes a conductive region, and
the printed circuit board and the first hinge bracket are connected to each other with a conductive tape.

17. The hinge device of claim 16, wherein a region of the first hinge bracket connected to the conductive tape is a region from which a coating of the first hinge bracket is removed.

18. The hinge device of claim 17, wherein the conductive region of the printed circuit board, the conductive tape, and the region of the first hinge bracket from which the coating of the first hinge bracket is removed, at least partially overlap each other.

19. The hinge device of claim 15, wherein the fixing member is a clip.

20. The hinge device of claim 15, wherein at least one of a size, shape, thickness, length, and material of the fixing member is determined depending on a characteristic of the electrical connection member.

* * * * *